Patented Dec. 13, 1932

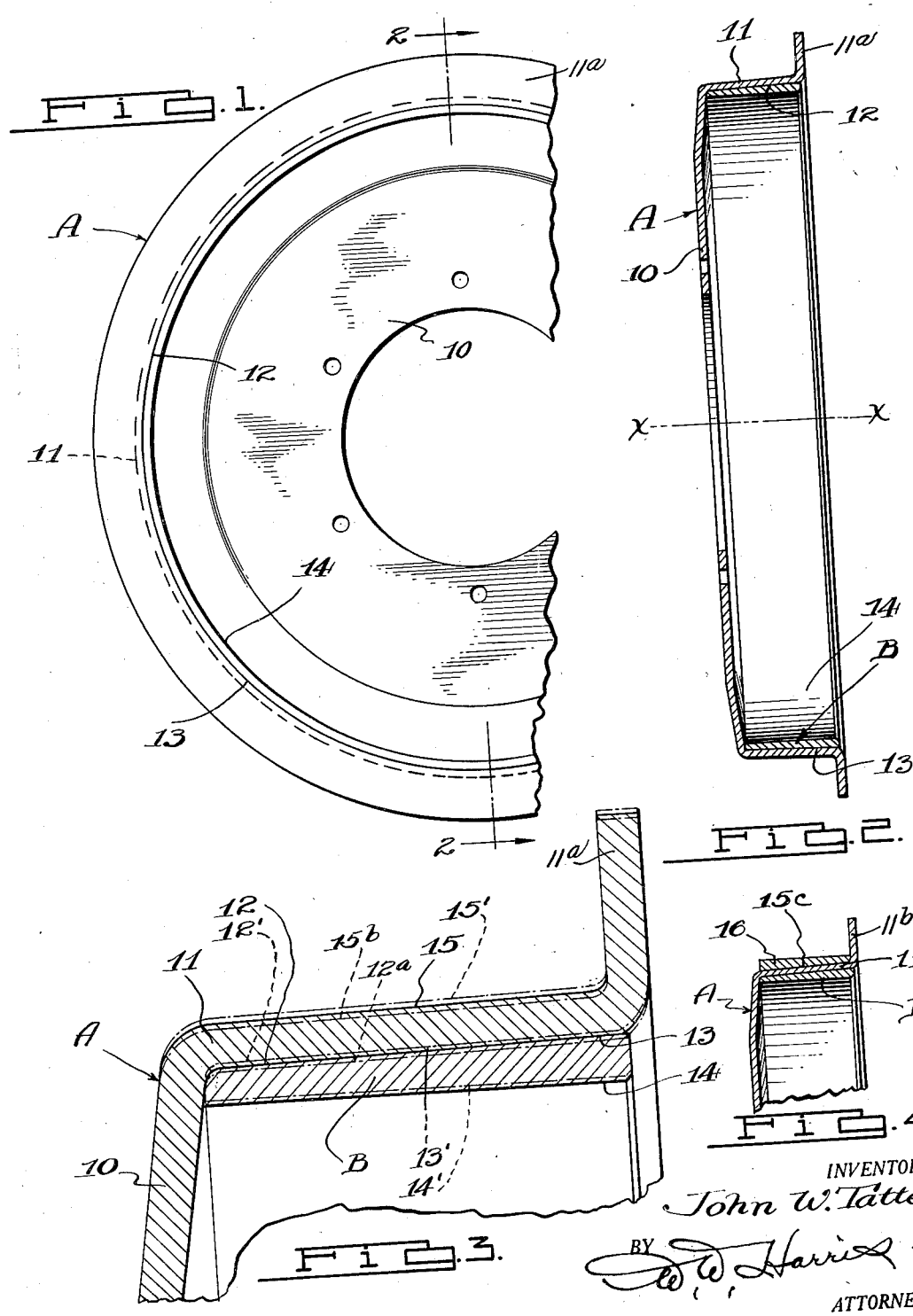

1,890,705

UNITED STATES PATENT OFFICE

JOHN W. TATTER, OF DETROIT, MICHIGAN, ASSIGNOR TO LEWIS DIFFERENTIAL COMPANY, OF CHICAGO, ILLINOIS, A CORPORATION OF ILLINOIS

BRAKE DRUM

Application filed March 21, 1931. Serial No. 524,229.

This invention relates to brakes and refers more particularly to an improved brake drum and method of manufacturing same.

Heretofore considerable difficulty has been experienced in the use of brake drums. It is regarded as very desirable in this art to provide a brake drum having a working surface for engagement with the usual brake shoe or shoes, where the surface is formed of cast iron or a high carbon steel since such metals have a very excellent braking action. As an example, a brake drum having a cast iron wearing surface does not readily score and the brake shoes used in conjunction therewith will last for a relatively long period of time. Where the brake drum is formed of cast iron such drum must be made relatively large in order to stand the stresses to which it is subjected with the result that the resulting drum is very heavy and very expensive. Furthermore, where the drum is made of a high carbon steel it has been found that such material does not lend itself readily to dies for forming the drum.

It is an object of my invention to provide a brake drum and method of manufacturing same wherein the brake drum body may be formed of a low carbon steel which may be readily fashioned with dies, such drum having a liner or wear engaging surface formed of cast iron or high carbon steel.

It is a further object of my invention to provide a brake drum of the foregoing type which may be readily and cheaply manufactured and which will give improved operating characteristics.

In general my invention includes the provision of a ring or liner formed of a material having the general characteristics of cast iron or high carbon steel, the drum having a body portion which is secured to the liner by heating the body portion and allowing the same to shrink in position around the liner. In order to facilitate this method and structure I have discovered that by providing the adjacent faces of the body portion and liner with a taper that the liner is readily insertable in position and will retain this position in use.

In order to more fully describe and illustrate the salient features of my invention, I have illustrated several preferred embodiments in the accompanying drawing in which:

Figure 1 is a side elevational view of a portion of the drum,

Figure 2 is a sectional view along the line 2—2 of Figure 1,

Figure 3 is an enlarged detailed view illustrating the manner in which the drum and liner is positioned, and Figure 4 is a view corresponding to Figure 3 illustrating a modified form.

Referring to the drawing, reference character A represents the brake drum having the usual hub flange 10 for engagement with the vehicle wheel and the annular drum flange or body portion 11. This body portion is provided with an inner surface 12 which is tapered so as to provide a frusto-conical surface which tapers with respect to the drum axis X—X. As stated heretofore this drum A is preferably formed of a low carbon steel or other suitable material capable of being fashioned by suitable drawing dies and having the necessary strength for a relatively light weight construction. B represents a cast iron liner or band which is formed with an outer frusto-conical surface 13 corresponding to the similar surface 12 of the drum A. The liner B also has an inner cylindrical surface 14 which provides a working surface for the usual friction lined brake shoe or shoes (not shown). If desired the liner B may be formed of a high carbon steel which may be conveniently formed into a ring as by rolling a suitable strip of material and welding to form the endless liner or band.

Prior to the shrinking operation which will be hereinafter described, the liner B will be somewhat greater in diameter than in its final position as illustrated in Figure 3. Thus the surfaces 13 and 14 will respectively assume a position illustrated by the dotted lines 13′ and 14′. In securing the liner in position with the drum body portion I heat the drum A to a sufficient temperature to cause a material expansion in diameter of the body portion 11 whereby the surface 12 thereof is positioned generally as illustrated by the dotted line 12', the outer surface 15 lying at 15'. With the body portion so heated the liner B (preferably not heated) is inserted in position within the drum body, the frusto-conical surfaces guiding and facilitating the entry of the liner B into its proper position. The drum is then permitted to cool and on doing so will tend to decrease in diameter to its original position as indicated by the dotted lines 12a and 15b but will be restrained from entirely reaching such position by reason of a liner B. I find that the liner B will be subjected by such cooling action of the drum to a compression as generally illustrated by the difference in diameter between lines 13' and 14' and 13 and 14. Thus it will be noted that after the cooling action has taken place the drum body portion will be under an initial tension and the liner will be under an initial compression and I find that this is very desirable in connection with the braking operation which develops heat in the liner B. Under the influence of such heat the liner and drum body tend to expand but by reason of my construction and process there will be sufficient tension in the drum body to at all times maintain adequate contact between the drum and liner to prevent any relative movement of these parts. Furthermore, the tension in the drum will not permit a free expansion of the drum liner but will tend to materially reduce the increase in diameter of the drum liner when the brake drum is subjected to actual operation. In order to still further reduce the expansion of the drum liner and to additionally seat the liner in position, the drum body 11' of the modification shown in Figure 4 may be formed with an outer frusto-conical surface 15c to receive an external ring or band 16 having an inner similar frusto-conical surface. With this construction the liner B and drum body 11' will be assembled as described in connection with Figure 3 and with these parts in their final cooled position the liner 16 will be heated to expand the same and permit its insertion around the surface 15c whereupon as the band 16 cools it will shrink in position.

The drum flange 11 may terminate outwardly thereof in an outwardly extending flange 11a which stiffens the drum against distortion whereby the drum parts may be made somewhat thinner in cross-section than otherwise. Lightness of weight is desirable and also reduces the drum cost. In Fig. 4 the corresponding stiffening flange is indicated at 11b.

What I claim as my invention is:

1. A brake drum comprising a steel body portion having an inner frusto-conical surface, and a cast iron liner held within said body portion, said liner having an outer frusto-conical surface engaging said frusto-conical surface of the body portion, said liner having an inner cylindrical braking surface.

2. A brake drum comprising a steel body portion having an inner frusto-conical surface, and a cast iron liner held within said body portion, said liner having an outer frusto-conical surface engaging said frusto-conical surface of the body portion, said liner having an inner cylindrical braking surface, said body portion being under tension and said liner being under compression sufficient to maintain said engagement as the drum is heated in use.

3. A brake drum having a body portion formed with an inner frusto-conical surface, and a liner held within said body portion, said liner formed with an outer frusto-conical surface engaging said frusto-conical surface of the body portion, said liner having an inner cylindrical braking surface.

4. A brake drum having an annularly flanged body portion, said flange having an inner frusto-conical surface, and a brake engaging liner having an outer frusto-conical surface engaging said frusto-conical surface of said flange, said liner having an inner cylindrical braking surface, said body portion being under tension and said liner being under compression sufficient to maintain said engagement as the drum is heated in use.

5. A brake drum having a hub flange and an annular drum flange, a brake engaging lining secured under compression within said annular drum flange, said drum flange and lining having engaging frusto-conical surfaces, said annular drum flange terminating outwardly of the drum in a stiffening flange extending outwardly of said annular drum flange.

6. A brake drum having an annular drum flange provided with a cylindrical brake surface inwardly thereof, said annular drum flange having a frusto-conical outer surface, and a tension band surrounding said annular drum flange, said band having a frusto-conical surface engaging the frusto-conical surface of said annular drum flange.

7. A brake drum having an annular drum flange lined inwardly thereof with a brake engaging material, said lining having a cylindrical brake engaging surface, said annular drum flange having a frusto-conical outer surface, and a tension band surrounding said annular drum flange, said band having a frusto-conical surface engaging the frusto-conical surface of said annular drum flange.

In testimony whereof I affix my signature.

JOHN W. TATTER.